United States Patent
Li et al.

(10) Patent No.: US 12,101,423 B2
(45) Date of Patent: Sep. 24, 2024

(54) ROLLING DISPLAY ARRANGEMENT FOR ELECTRONIC DEVICE

(71) Applicant: Huawei Technologies Co., Ltd., Shenzhen (CN)

(72) Inventors: Xueqiang Li, Dongguan (CN); Miika Keskinen, Helsinki (FI); Mika Ojanto, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 242 days.

(21) Appl. No.: 17/504,376

(22) Filed: Oct. 18, 2021

(65) Prior Publication Data

US 2022/0038564 A1 Feb. 3, 2022

Related U.S. Application Data

(63) Continuation of application No. PCT/EP2019/060155, filed on Apr. 18, 2019.

(51) Int. Cl.
*H04M 1/02* (2006.01)
*G06F 1/16* (2006.01)

(52) U.S. Cl.
CPC ........ *H04M 1/0268* (2013.01); *G06F 1/1652* (2013.01); *H04M 1/0237* (2013.01)

(58) Field of Classification Search
CPC . H04M 1/0268; H04M 1/0237; G06F 1/1652; G06F 1/16; G06F 1/1624
See application file for complete search history.

(56) References Cited

U.S. PATENT DOCUMENTS

| | | | |
|---|---|---|---|
| 8,711,566 B2 | 4/2014 | O'Brien | |
| 9,071,673 B2 | 6/2015 | Choi et al. | |
| 9,704,932 B2 | 7/2017 | Lee et al. | |
| 10,025,355 B2 | 7/2018 | Bohn et al. | |
| 10,124,829 B2 * | 11/2018 | Merrill | B60B 35/02 |
| 10,209,742 B2 | 2/2019 | Shin | |
| 10,225,385 B2 | 3/2019 | Shin et al. | |
| 11,194,363 B2 * | 12/2021 | Kim | G06F 1/1652 |
| 2006/0176243 A1 | 8/2006 | Yeh | |
| 2010/0277860 A1 | 11/2010 | Jeong et al. | |
| 2013/0058063 A1 * | 3/2013 | O'Brien | G06F 1/1624 |
| | | | 361/807 |
| 2013/0076612 A1 * | 3/2013 | Myers | H05K 7/06 |
| | | | 29/729 |
| 2015/0009611 A1 * | 1/2015 | Constin | G06F 1/1681 |
| | | | 361/679.11 |

(Continued)

FOREIGN PATENT DOCUMENTS

| | | |
|---|---|---|
| CN | 102902308 A | 1/2013 |
| CN | 105609001 A | 5/2016 |

(Continued)

*Primary Examiner* — Rockshana D Chowdhury
*Assistant Examiner* — Martin Antonio Asmat Uceda
(74) *Attorney, Agent, or Firm* — Leydig, Voit & Mayer, Ltd.

(57) ABSTRACT

A rolling display arrangement for an electronic device includes a display module, a shaft module, and at least one transmission module, the transmission module being configured to transfer rotational movement of the shaft module and the transmission module to linear movement of the display module. Such a rolling display arrangement allows the display module to slide linearly.

16 Claims, 7 Drawing Sheets

(56) References Cited

U.S. PATENT DOCUMENTS

| | | | | |
|---|---|---|---|---|
| 2016/0143131 A1* | 5/2016 | Ahn | ................. | H05K 1/028 |
| | | | | 361/749 |
| 2016/0324021 A1* | 11/2016 | Takayanagi | ........... | G06F 1/1652 |
| 2018/0077808 A1 | 3/2018 | Seo et al. | | |
| 2018/0125228 A1* | 5/2018 | Porter | ................. | H05K 5/0017 |
| 2018/0366522 A1 | 12/2018 | Han et al. | | |

FOREIGN PATENT DOCUMENTS

| | | | | | |
|---|---|---|---|---|---|
| CN | 106782096 A | | 5/2017 | | |
| CN | 106920830 A | | 7/2017 | | |
| CN | 107818735 A | | 3/2018 | | |
| CN | 108833630 A | | 11/2018 | | |
| CN | 109695624 B | * | 5/2020 | ............. | F16C 11/04 |
| EP | 3021192 A1 | | 5/2016 | | |
| JP | 2010178188 A | | 8/2010 | | |
| JP | 2011034087 A | | 2/2011 | | |
| JP | 2014531796 A | | 11/2014 | | |
| KR | 20110082943 A | | 7/2011 | | |
| KR | 20140059274 A | | 5/2014 | | |
| KR | 20160058329 A | | 5/2016 | | |
| KR | 20170008610 A | | 1/2017 | | |
| KR | 20170080017 A | | 7/2017 | | |
| KR | 101792692 B1 | * | 11/2017 | ............. | G09F 9/301 |
| KR | 20180030301 A | | 3/2018 | | |
| WO | WO-2018120086 A1 | * | 7/2018 | ............. | F16H 21/10 |
| WO | 2018144001 A1 | | 8/2018 | | |

\* cited by examiner

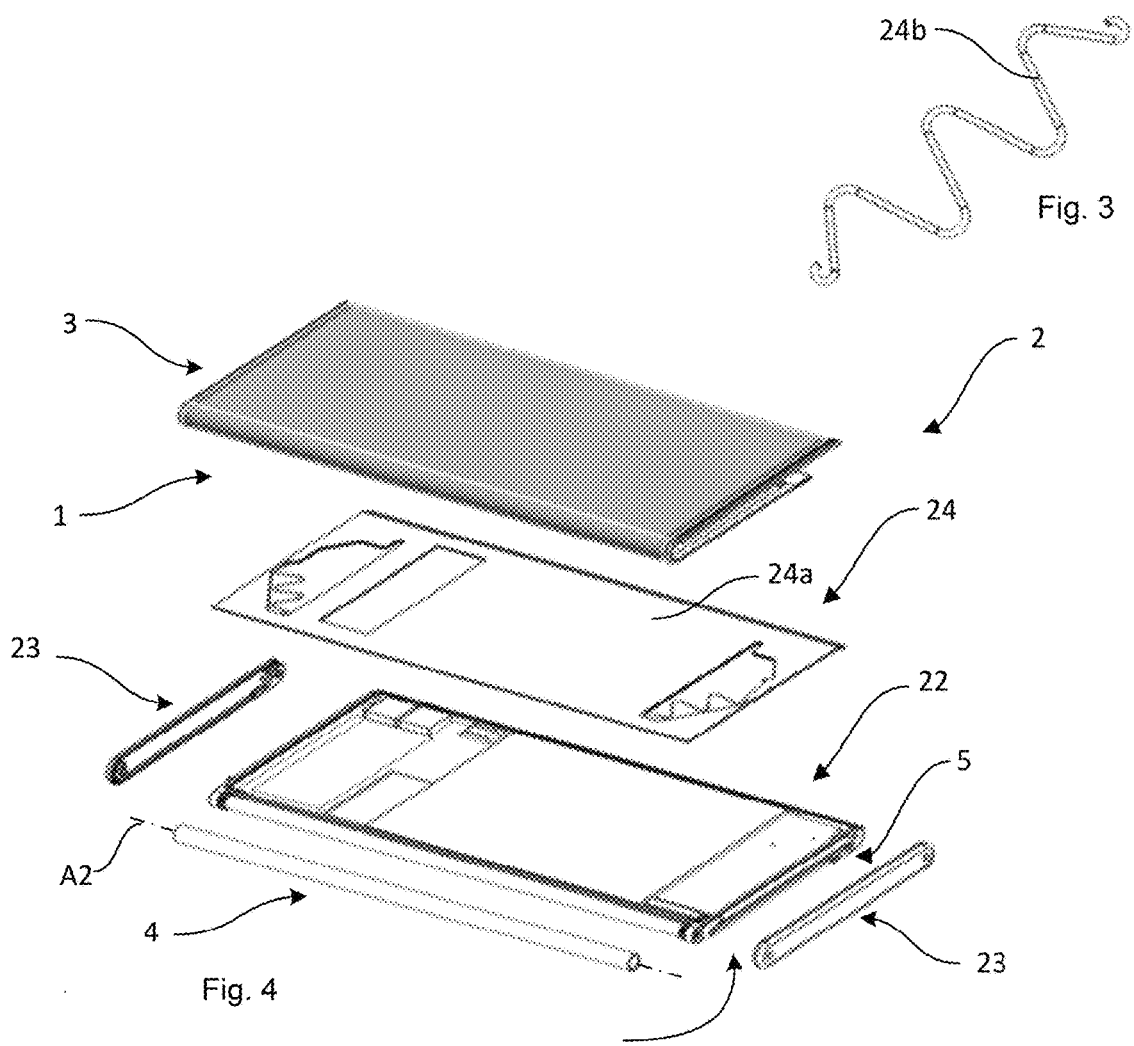
Fig. 3
Fig. 4
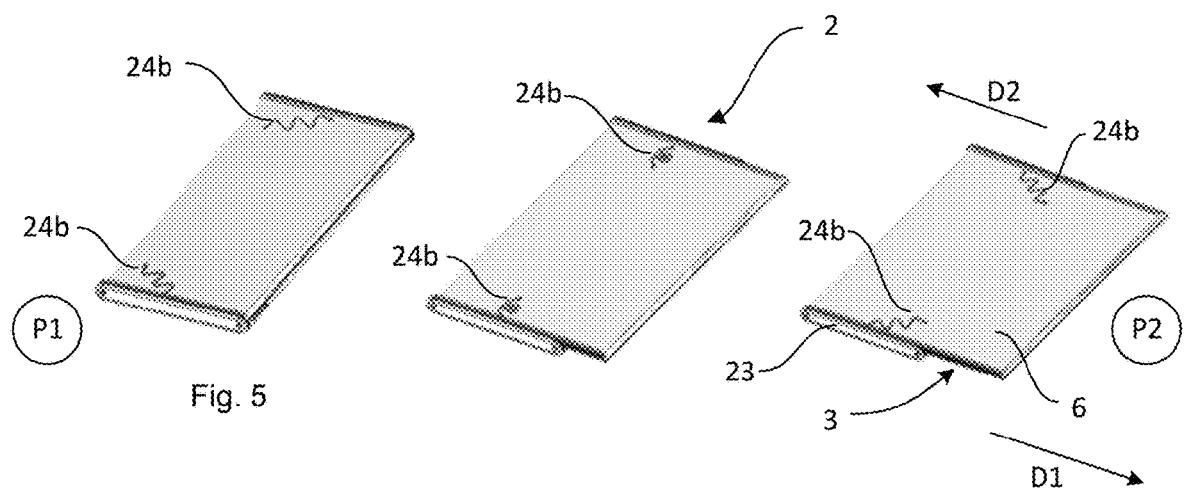
Fig. 5

ROLLING DISPLAY ARRANGEMENT FOR ELECTRONIC DEVICE

CROSS-REFERENCE TO RELATED APPLICATIONS

This application is a continuation of International Application No. PCT/EP2019/060155, filed on Apr. 18, 2019, the disclosure of which is hereby incorporated by reference in its entirety.

TECHNICAL FIELD

The disclosure relates to a rolling display arrangement for an electronic device.

BACKGROUND

The size of electronic devices, such as tablets and mobile phones, is an important consideration when designing mobile devices. In order to provide the best mobile device possible, the outer dimensions of the device have to be as small as is technically feasible, while still allowing the display of the device to be as large as possible.

This problem may be solved by means of a foldable electronic device such as that of U.S. Pat. No. 9,071,673, which discloses an electronic device comprising multiple housings interconnected by means of hinges and covered by one large display. The multiple housings, and the display, can be folded together to provide an as small device as possible, and unfolded to provide an as large display as possible.

Such a foldable solution has a reduced width when being folded together. However, the depth of the electronic device is substantial since several housing sections are stacked on top of each other. The depth may even be larger than the width, wherefore such a folded electronic device is bulky and aesthetically unappealing.

The provision of several housings not only makes the electronic device heavy and thick, but its foldable configuration also makes the electronic device electronically complicated.

Furthermore, the continuous folding of the display may lead to permanent deformation due to fatigue, since the folded area is subject to very high stress.

SUMMARY

Embodiments of the present disclosure provide an improved display arrangement.

According to a first aspect, there is provided a rolling display arrangement for an electronic device, the rolling display arrangement comprising a display module, a shaft module, and at least one transmission module, the transmission module being adapted for transferring rotational movement of the shaft module and the transmission module to linear movement of the display module.

Such a rolling display arrangement allows display module to slide linearly, and hence the size of the display to be changed without folding the display module, and the rotational movement allows a very spatially efficient means of driving the linear movement. Hence, the rolling display arrangement does not add significantly to the depth of the electronic device onto which it is mounted.

In a possible implementation of the first aspect, the display module comprises a flexible display and a display support, the display support comprising a first rigid part, a second rigid part, and a flexible part arranged between the first rigid part and the second rigid part, the first rigid part and the second rigid part extending in parallel, the flexible part partially enclosing the shaft module, the shaft module comprising a drive shaft and a drive shaft gear, the transmission module being interconnected with the first rigid part and the second rigid part of the display module, and with the drive shaft gear of the shaft module. The parallel configuration allows the flexible display to be securely arranged around the chassis module such that it is not damaged, e.g., during transportation. Furthermore, the combination of flexible and rigid parts provides enough support to the flexible display while still allowing it to be wrapped around the device chassis without deforming permanently.

In a further possible implementation of the first aspect, the transmission module comprises a drive belt, a transmission gear arrangement driving the drive belt, a first display clamp, and a second display clamp being arranged on the drive belt, the first display clamp being interconnected with the first rigid part of the display support, the second display clamp being interconnected with the second rigid part of the display support, facilitating a simple, synchronized, and spatially efficient means of driving the display module.

In a further possible implementation of the first aspect, the drive belt is arranged between, and extends substantially in parallel with, the first rigid part and the second rigid part of the display support.

In a further possible implementation of the first aspect, the transmission gear arrangement comprises a drive belt gear driving the drive belt and a synchronizing gear meshing with the drive shaft gear of the shaft module, the drive belt gear and the synchronizing gear sharing a first center axis, allowing the upper and lower edges of the flexible display to move synchronously.

In a further possible implementation of the first aspect, the first display clamp and the second display clamp of the transmission module each comprise a protrusion extending from the drive belt, the first rigid part and the second rigid part of the display support each comprise a recess for accommodating the protrusion, allowing the flexible display to be moved without any distortion arising between the upper and lower edges of the flexible display and hence avoiding the flexible display getting an unaesthetic appearance and/or getting stuck during movement.

In a further possible implementation of the first aspect, the shaft module further comprises a freely rotatable outer shaft and a stationary center shaft, the outer shaft, the drive shaft, and the center shaft sharing a second center axis, the drive shaft being arranged between the outer shaft and the center shaft, and the outer shaft being in abutment with the flexible part of the display support, providing a spatially efficient driving means and hence leaving more room, within the electronic device, for other components such as batteries.

In a further possible implementation of the first aspect, the outer shaft rotates in response to the linear movement of the display module, the outer shaft acting as a bearing as it reduces the friction as the display module is moving.

In a further possible implementation of the first aspect, the outer shaft comprises a helix-shaped cut extending through the wall of the outer shaft, in the direction of the second center axis, facilitating the assembly of the shaft module.

In a further possible implementation of the first aspect, counterclockwise rotational movement of the drive shaft is transferred to linear movement of the first rigid part in a first direction, clockwise rotational movement of the drive shaft is transferred to linear movement of the first rigid part in a second direction, the second direction being opposite to the first direction, and simultaneously the counterclockwise rotational movement of the drive shaft is transferred to linear movement of the second rigid part in the second direction, and the clockwise rotational movement of the drive shaft is transferred to linear movement of the second rigid part in the first direction. This solution facilitates a rolling display arrangement which is both simple and aesthetically pleasing, since all driving components are covered by the display module.

In a further possible implementation of the first aspect, the linear movement is perpendicular to the second center axis.

In a further possible implementation of the first aspect, the rolling display arrangement further comprises an electric motor, a motor gear of the electric motor meshing with the synchronizing gear of the transmission module, the electric motor effectuating the rotational movement of the shaft module and the transmission module. This facilitates electronic drive of the rolling display arrangement.

According to a second aspect, there is provided an electronic device comprising a chassis module, two end cap modules arranged at opposite short sides of the chassis module, and a rolling display arrangement according to the above, the rolling display arrangement partially enclosing the chassis module, the rolling display arrangement being interlocked with the chassis module by means of the end cap modules, the shaft module of the rolling display arrangement extending adjacent a long side of the chassis module between the end cap modules, each transmission module of the rolling display arrangement extending between the short side of the chassis module and the end cap. The enclosing configuration allows the rolling display arrangement to be securely arranged around the chassis module such that it is not damaged, e.g., during transportation.

In a possible implementation of the second aspect, the first rigid part of the display module extends adjacent a first main side of the chassis module, and the second rigid part of the display module extends adjacent a second, opposite main side of the chassis module, the flexible part extending from the first main side to the second main side, the combination of flexible and rigid parts providing enough support to the flexible display while still allowing it to be wrapped around the chassis module without deforming permanently.

In a further possible implementation of the second aspect, the electronic device further comprises a spring module arranged between the first main side of the chassis module and the display module, the spring module comprising a spring support and a tension spring, a first end of the tension spring being connected to the spring support, adjacent the end cap module, and a second end of the tension spring being connected to the first rigid part of the display module, the second end of the tension spring being moved in the first direction and in the second direction of linear movement along with the first rigid part. The spring module helps tightening the flexible display and rolling in/out the rolling display arrangement.

In a further possible implementation of the second aspect, the end cap module is releasably interconnected with the stationary center shaft of the shaft module.

In a further possible implementation of the second aspect, the rolling display arrangement is in one of a retracted position and an extended position, the display module covering the first main side of the chassis module, and the display module covering a part of the second main side of the chassis module, the second main side being opposite to the first main side of the chassis module, when the rolling display arrangement is in the retracted position, the display module protruding past the first main side of the chassis module, and the display module covering a part of the second main side of the chassis module which is smaller than the corresponding part in the retracted position, when the rolling display arrangement is in the extended position. Such an electronic device comprises a display module which slides linearly, and hence the size of the display changes without folding the display module, and the rotational movement allows a very spatially efficient means of driving the linear movement.

In a further possible implementation of the second aspect, in the retracted position, the first main side of the chassis module is fully covered by the first rigid part, and the second main side of the chassis module is fully covered by the second rigid part and a part of the flexible part, and, in the extended position, the first main side of the chassis module is fully covered by the first rigid part and a part of the flexible part, and the second main side of the chassis module is partially covered by the second rigid part, allowing the flexible display to be as small, or as large, as possible, according to the wish of the user.

In a further possible implementation of the second aspect, the rolling display arrangement is moved to an extended position when counterclockwise rotational movement of the drive shaft is transferred to linear movement of the first rigid part in a first direction and to linear movement of the second rigid part in a second, opposite direction, and wherein the rolling display arrangement is moved to a retracted position when clockwise rotational movement of the drive shaft is transferred to linear movement of the first rigid part in the second direction, and to linear movement of the second rigid part in the first direction.

This and other aspects will be described below.

BRIEF DESCRIPTION OF THE DRAWINGS

In the following description, aspects, embodiments and implementations of the present disclosure will be explained in more detail with reference to the example embodiments shown in the drawings, in which:

FIG. 3 shows a perspective view of a spring of a spring module of an electronic device comprising a rolling display arrangement in accordance with one embodiment of the present disclosure;

FIG. 4 shows an exploded perspective view of an electronic device comprising a rolling display arrangement in accordance with one embodiment of the present disclosure;

FIG. 5 shows a perspective view of a spring module of an electronic device comprising a rolling display arrangement in accordance with one embodiment of the present disclosure, the display module of the rolling display arrangement being in a retracted position, an intermediate position, and an extended position;

DETAILED DESCRIPTION

Figure 1:
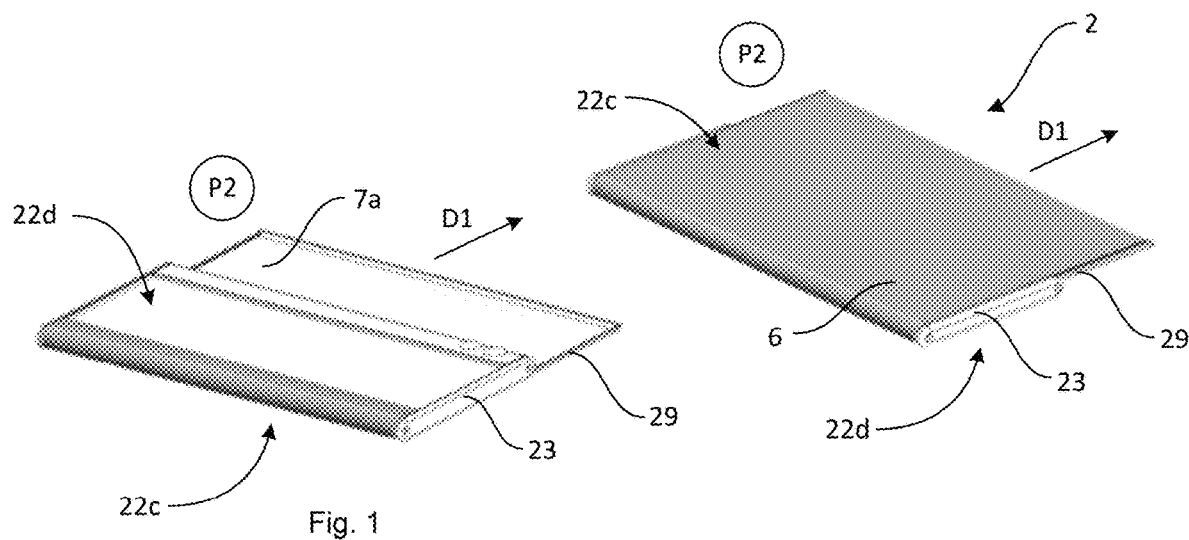
FIG. 1 shows perspective front and rear views of an electronic device comprising a rolling display arrangement in accordance with one embodiment of the present disclosure.

FIG. 1 shows an electronic device 2 comprising a chassis module 22. The chassis module has two oppositely arranged short sides 22a and two oppositely arranged long sides 22b, the long sides 22b extending perpendicular to the short sides 22a. The short sides 22a and the long sides 22b form the edge area of the electronic device 2. The chassis module 22 furthermore has two oppositely arranged main surfaces, the first main side 22c and the second main side 22d, which extend substantially perpendicular to both the short sides 22a and the long sides 22b.

The electronic device further comprises two end cap modules 23 arranged at opposite short sides 22a of the chassis module 22, and a rolling display arrangement 1 described in more detail below. The rolling display arrangement 1 partially encloses the chassis module 22, for example being adapted for covering one long side 22b, the first main side 22c, and the second main side 22d of the chassis module 22. The remaining long side 22b is not covered by the rolling display arrangement 1, regardless of the position of the rolling display arrangement 1. The rolling display arrangement 1 is interlocked with the chassis module 22 by means of the end cap modules 23, which are arranged adjacent the short sides 22a of the chassis module 22. In an exemplifying configuration, each end cap module 23 comprises an end cap and one or more screws, for example 2 screws. The end of the end cap which is closest to the covered long side 22b is connected to the rolling display arrangement 1 by means of one screw. Correspondingly, the opposite end of the end cap, i.e. the end which is closest to the non-covered long side 22b, is connected to the chassis module 22 by means of one screw.

The rolling display arrangement 1 may be in a retracted position P1 or an extended position P2. In the extended position P2, the electronic device 2 has one large visible display extending farther to one side than the chassis module. In the retracted position P1, only a part of the large visible display extends along the front of the electronic device 2, i.e. adjacent the first main surface 22c of the chassis module 22, and the rest of the large visible display is folded around one long side 22b of the chassis module and along the back of the electronic device 2, i.e. adjacent the second main surface 22d of the chassis module 22. This allows the user to use a full-size display when, e.g., viewing video and to use a smaller display when using the device as a phone or during transport.

The chassis module 22 comprises the internal components of the electronic device, such as battery, main board, integrated circuits, processors, memory, cameras, speakers, flexible circuit boards and cables.

The rolling display arrangement 1 comprises, as shown in FIG. 4, a display module 3, a shaft module 4, and at least one, in an illustrative example two, transmission modules 5. The transmission module 5 is adapted for transferring rotational movement of the shaft module 4 and the transmission module 5 to linear movement of the display module 3. Each transmission module 5 extends between one short side 22a of the chassis module 22 and one end cap module.

The shaft module 4 of the rolling display arrangement 1 extends adjacent the covered long side 22b of the chassis module 22 and between the end cap modules 23, and the flexible part 7c partially encloses the shaft module 4, i.e. the shaft module 4 is enclosed along its center axis, i.e. second center axis A2, while the opposite ends of the shaft module 4 are non-covered. The above-mentioned linear movement may be perpendicular to the second center axis A2. The shaft module 4 will be described in more detail further below.

Figure 14:
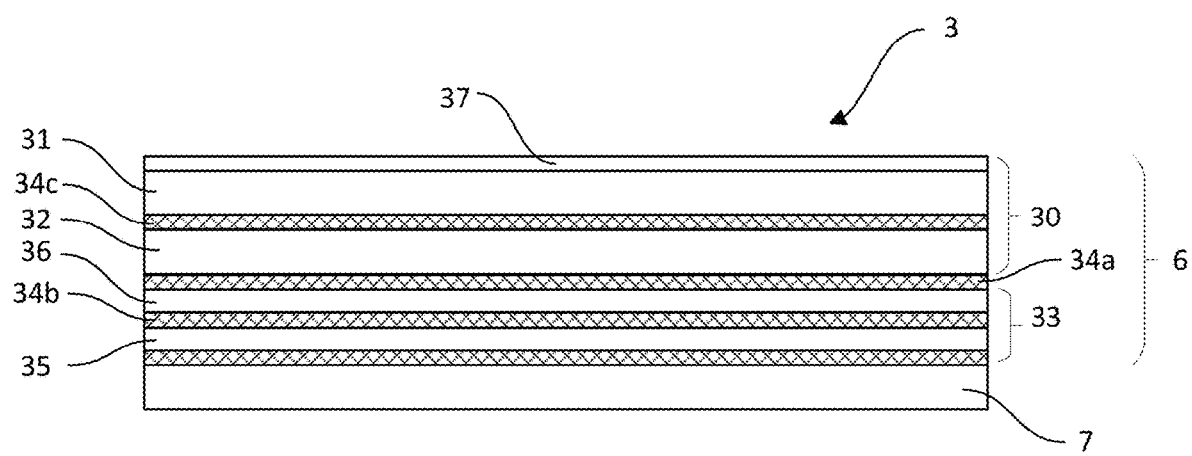
FIG. 14 shows a cross-sectional side view of a display module of a rolling display arrangement in accordance with one embodiment of the present disclosure.

The display module 3 comprises a display support 7 and a flexible display 6, as shown in FIG. 14. The flexible display 6 will be described in more detail further below. The display module 3 is pre-assembled, as a sub-assembly, and subsequently slid onto the chassis module 22, and fixed into place by means of the end cap modules 23. The short sides 22a of the chassis module 22 and the inside of the end cap modules 23 form a groove in which the edge of the display module 3 fits and is maintained into place.

Figure 16:
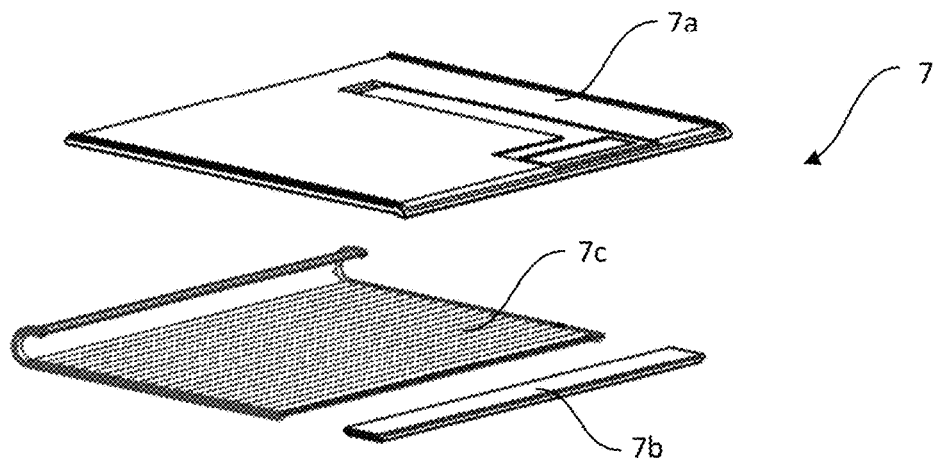
FIG. 16 shows an exploded view of a display support of a rolling display arrangement in accordance with one embodiment of the present disclosure.

The display support 7 comprises a first rigid part 7a, a second rigid part 7b, and a flexible part 7c arranged between the first rigid part 7a and the second rigid part 7b, as shown in FIG. 16. The display module 3 is adapted for folding such that the first rigid part 7a and the second rigid part 7b extend in parallel, as the rolling display arrangement 1 encloses the chassis module 22. The first rigid part 7a of the display module 3 extends adjacent a first main side 22c of the chassis module 22, and the second rigid part 7b of the display module 3 extends adjacent a second, opposite main side 22d of the chassis module 22. The flexible part 7c extends from the first main side 22c to the second main side 22d.

Figure 17:
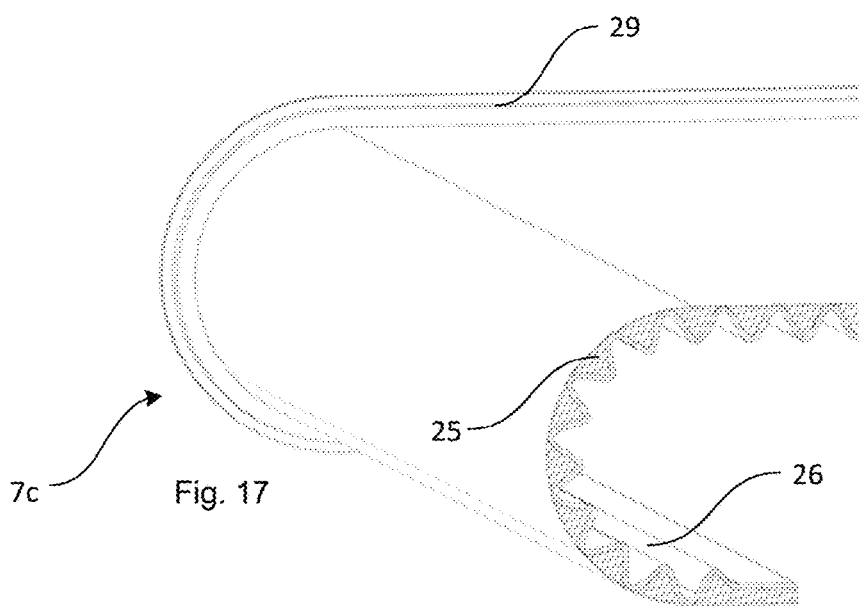
FIG. 17 shows a partial perspective view of a part of a display support of a rolling display arrangement in accordance with one embodiment of the present disclosure.

The first rigid part 7a and/or the second rigid part 7b may include metal or may be made of metal. The flexible part 7c of the display module 3 may comprise of an elastomer layer 25 and a corrugated metal layer 26 superimposed onto each other, as shown in FIG. 17, for example co-moulded together. When the display module 3 is mounted onto the chassis module 22, the flexible part 7c is folded such that the corrugated metal layer 26 faces the interior of the display module 3, and the corrugated metal layer 26 faces at least one of the first rigid part 7a and the second rigid part 7b. The elastomer layer 25 has at least one planar surface, allowing the flexible display 6 to be adhered to the planar surface of the elastomer layer 25, for example by means of an adhesive layer 27. The opposite surface of the elastomer layer 25 is for example corrugated as well, such that the ridges of the elastomer layer 25 fill the valleys of the corrugated metal layer 26. The corrugation adds stiffness in a direction perpendicular to the surface of the flexible part 7c, while still being flexible in the direction of linear movement.

The display module 3 encloses the chassis module 22 such that the first rigid part 7a of the display module 3 extends adjacent the first main side 22c of the chassis module 22, and the second rigid part 7b of the display module 3 extends adjacent the second, opposite main side 22d of the chassis module 22. Hence, the flexible part 7c of the display module 3 extends from the first main side 22c to the second main side 22d.

Figure 18:
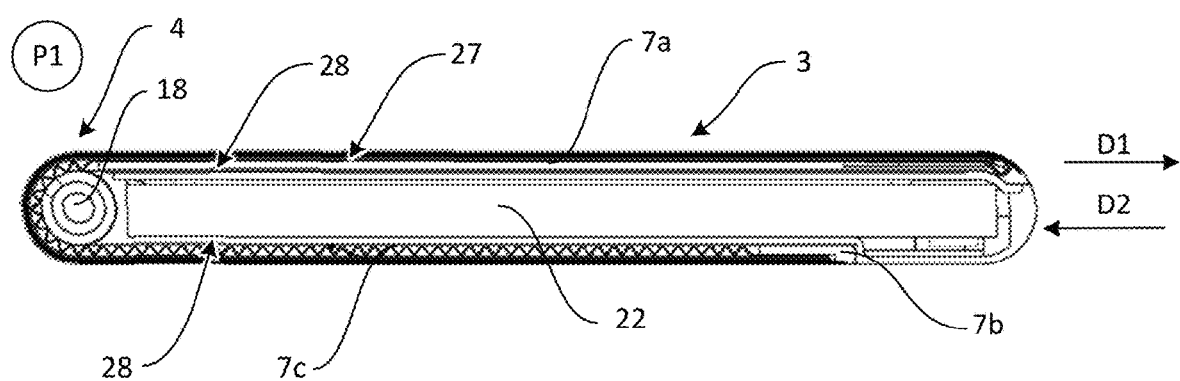
FIG. 18 shows a cross-sectional side view of an electronic device comprising a rolling display arrangement in accordance with one embodiment of the present disclosure.

The display support 7 may comprises at least one lubricating layer 28, applied onto at least one of the first rigid part 7a and the corrugated metal layer 26, as shown in FIG. 18. The lubricating layer 28 is made from Polyoxymethylene (POM) material or any other suitable lubricated material, and it minimizes the amount of friction and allows the display module 3 to slide smoothly.

Figure 15:
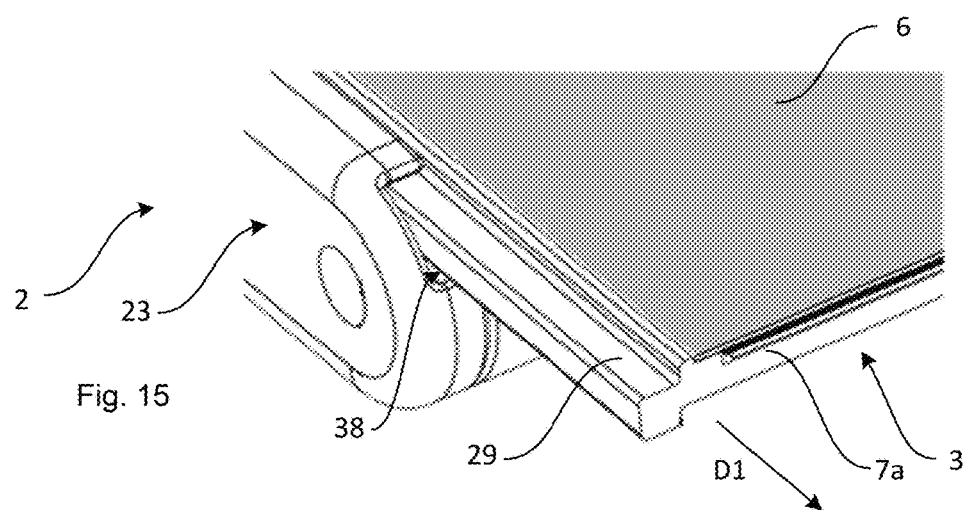
FIG. 15 shows a partial perspective view of a part of an electronic device comprising a rolling display arrangement in accordance with one embodiment of the present disclosure.

In one embodiment, the display support 7 comprises two reinforcement bars 29 extending along a first edge and a second opposite edge of the display support 7. Each end cap module 23 comprises a corresponding groove 38 adapted for accommodating the reinforcement bar 29, as shown in FIG. 15.

Figure 2:
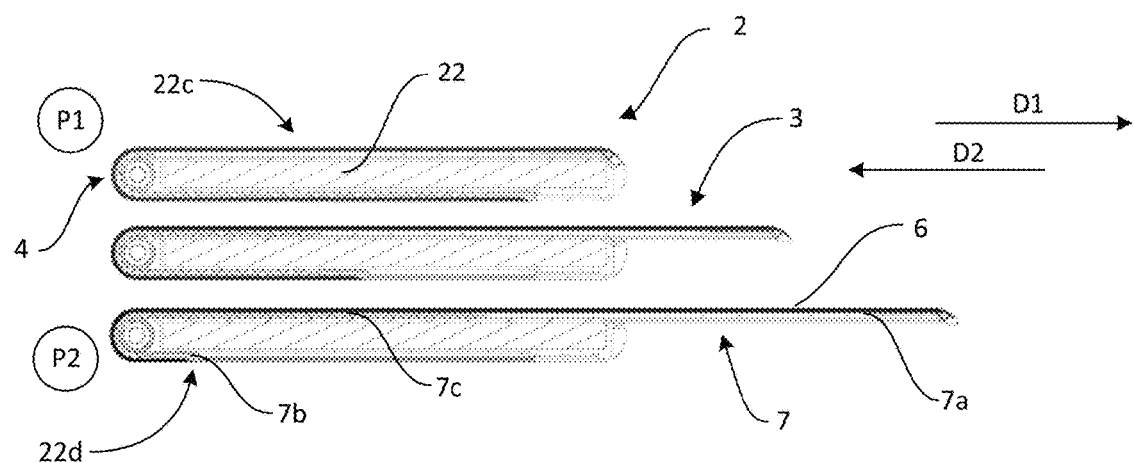
FIG. 2 shows a cross-sectional side view of an electronic device comprising a rolling display arrangement in accordance with one embodiment of the present disclosure, the display module of the rolling display arrangement being in a retracted position, an intermediate position, and an extended position.

As mentioned above, the transmission module 5 is adapted for transferring rotational movement of the shaft module 4 and the transmission module 5 to linear movement of the display module 3. The linear movement is executed in a first direction D1 and a second, opposite direction D2. As shown in FIG. 2, the rolling display arrangement 1 may be in one of a retracted position P1 and an extended position P2. When the rolling display arrangement 1 is in the retracted position P1, the display module 3 covers the first main side 22c of the chassis module 22, and the display module 3 also covers a part of the second main side 22d of the chassis module 22. When the rolling display arrangement 1 is in the extended position P2, the display module 3 protrudes past the first main side 22c of the chassis module 22, past the non-covered long side 22b, and the display module 3 also covers a part of the second main side 22d of the chassis module 22 which is smaller than the corresponding part in the retracted position P1.

Figure 6:
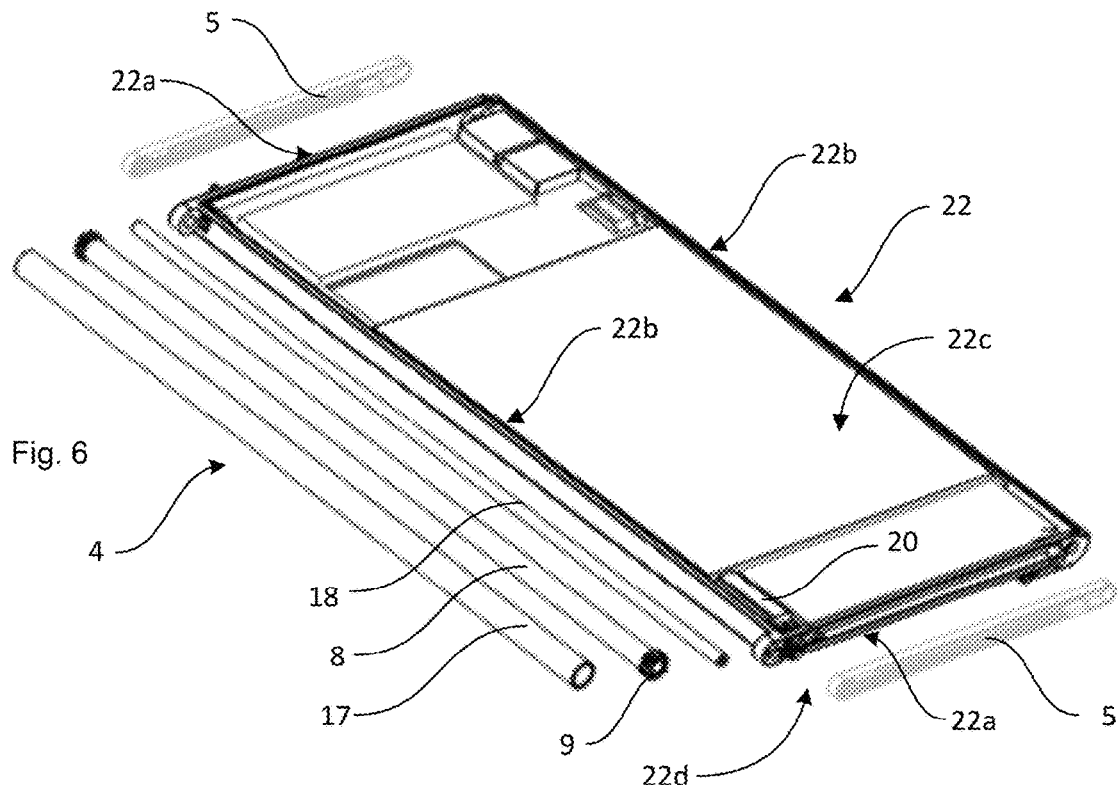
FIG. 6 shows an exploded perspective view of parts of an electronic device comprising a rolling display arrangement in accordance with one embodiment of the present disclosure.
Figure 10:
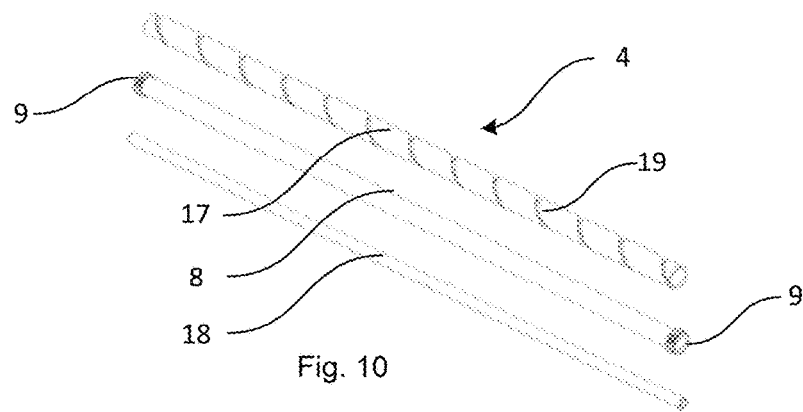
FIG. 10 shows an exploded perspective view of a shaft module of a rolling display arrangement in accordance with one embodiment of the present disclosure.

As shown in FIGS. 6 and 10, the shaft module 4 comprises a drive shaft 8 and a drive shaft gear 9 arranged at each end of the drive shaft 8. The shaft module 4 may further comprise a freely rotatable outer shaft 17 and a stationary center shaft 18, the outer shaft 17, the drive shaft 8, and the center shaft 18 sharing a second center axis A2. The drive shaft 8 is arranged between the outer shaft 17 and the center shaft 18, and the outer shaft 17 is in abutment with the flexible part 7c of the display support 7. The freely rotatable outer shaft 17 rotates in response to the linear movement of the display module 3, acting as a bearing as it reduces the friction when the display support 7 is moving. The outer shaft 17 is made of POM material, a self-lubricating plastic. When the display module 3 rolls around the outer shaft 17, it has to be deformed, and its linear movement becomes rotational movement. At this time, force and friction, applied onto the display module 3, are at their largest. The design of the outer shaft 17 and the use of self-lubricating material minimizes the amount of friction and allows the display module 3 to slide smoothly.

In one embodiment, shown in FIG. 10, the outer shaft 17 comprises a helix-shaped cut 19 which extends through the wall of the outer shaft 17, in a helix shape, in the direction of the second center axis A2. This allows the outer shaft 17 to be expanded during assembly of the shaft module 4, facilitating arranging the outer shaft 17 around the drive shaft 8.

Figure 11:
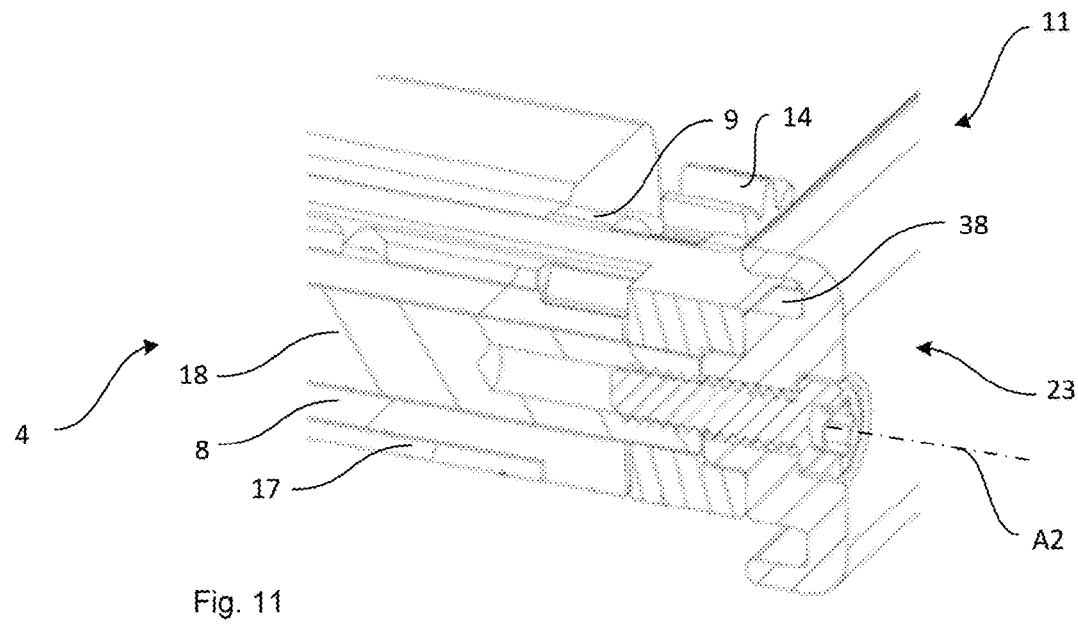
FIG. 11 shows a partial cross-sectional view of a part of an electronic device comprising a rolling display arrangement in accordance with one embodiment of the present disclosure.

In one embodiment, each end cap module 23 is releasably interconnected with the stationary center shaft 18 of the shaft module 4, as shown in FIG. 11.

Figure 7:
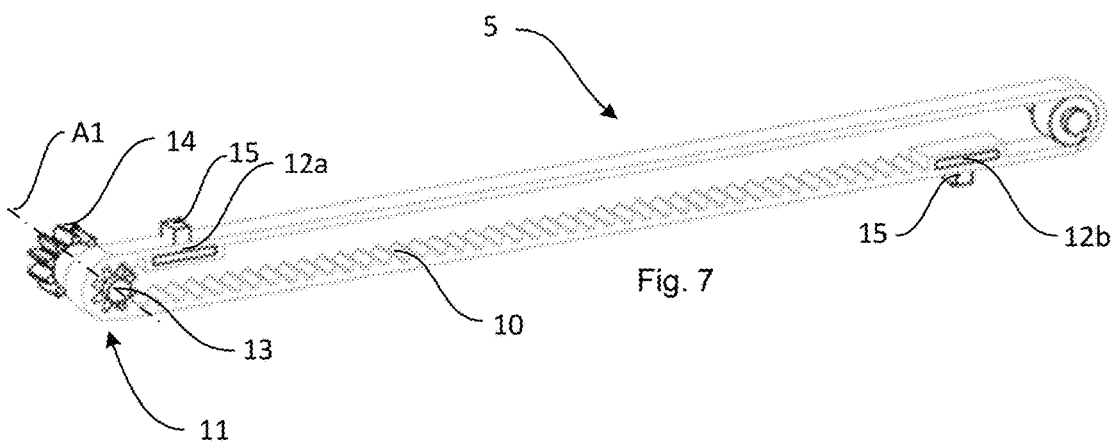
FIG. 7 shows a perspective view of a transmission module of a rolling display arrangement in accordance with one embodiment of the present disclosure.
Figure 8:
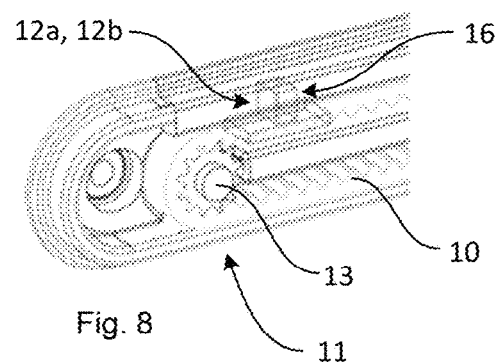
FIG. 8 shows a partial perspective view of a part of an electronic device comprising a rolling display arrangement in accordance with one embodiment of the present disclosure.

The transmission module 5 may be interconnected with the first rigid part 7a and the second rigid part 7b of the display module 3, and with the drive shaft gear 9 of the shaft module 4. As shown in FIGS. 7 and 8, the transmission module 5 comprises a drive belt 10, a transmission gear arrangement 11 driving the drive belt 10, a first display clamp 12a, and a second display clamp 12b being arranged on the drive belt 10.

Figure 12:
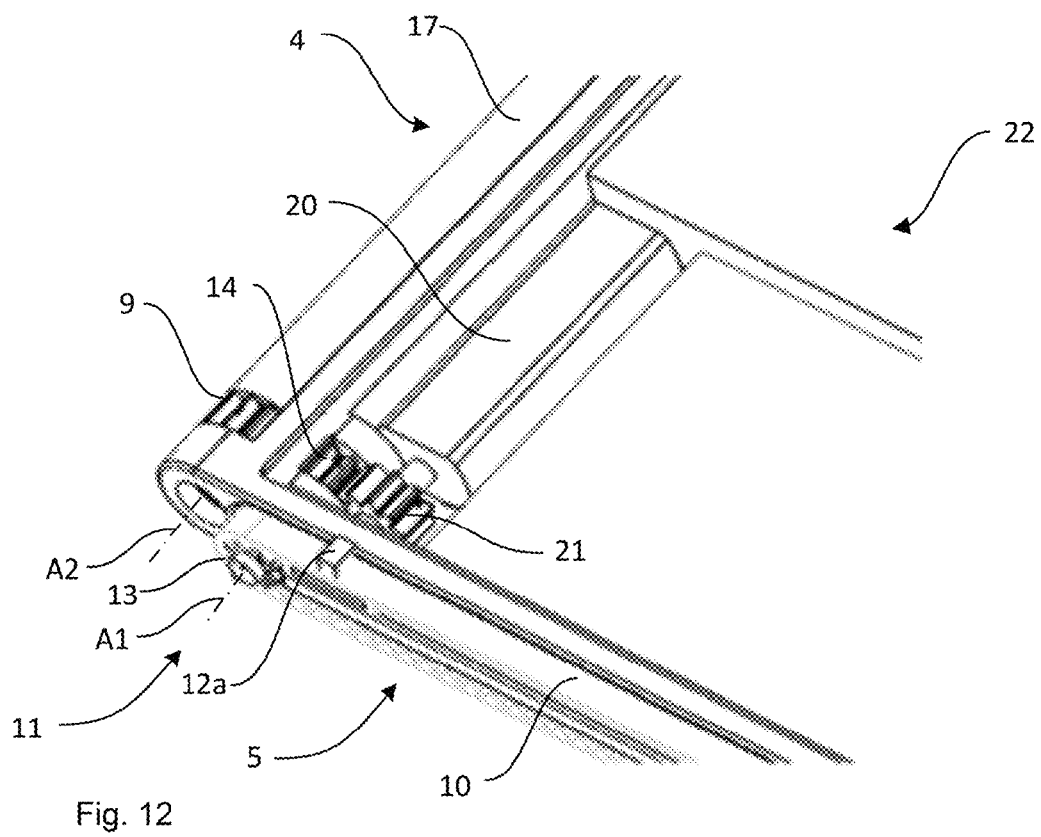
FIG. 12 shows a partial perspective view of a part of an electronic device comprising a rolling display arrangement in accordance with one embodiment of the present disclosure.

The transmission gear arrangement 11 comprises a drive belt gear 13, driving the drive belt 10, and a synchronizing gear 14 meshing with the drive shaft gear 9 of the shaft module 4. The drive belt gear 13 and the synchronizing gear 14 share a further center axis, i.e. first center axis A1, as shown in FIGS. 7, 11, and 12.

As shown in FIG. 18, the drive belt 10 is arranged between, and extends substantially in parallel with, the first rigid part 7a and the second rigid part 7b of the display support 7.

The first display clamp 12a is interconnected with the first rigid part 7a of the display support 7, and the second display clamp 12b is interconnected with the second rigid part 7b of the display support 7. In one embodiment, the first display clamp 12a and the second display clamp 12b each comprise a protrusion 15 extending from the drive belt 10, and the first rigid part 7a and the second rigid part 7b of the display support 7 each comprise a recess 16 for accommodating the protrusion 15, as shown in FIG. 8.

A drive shaft gear 9 and a transmission gear arrangement 11 engages, at both sides of the drive shaft 8, synchronizing the drive of both drive belts 10.

Figure 9:
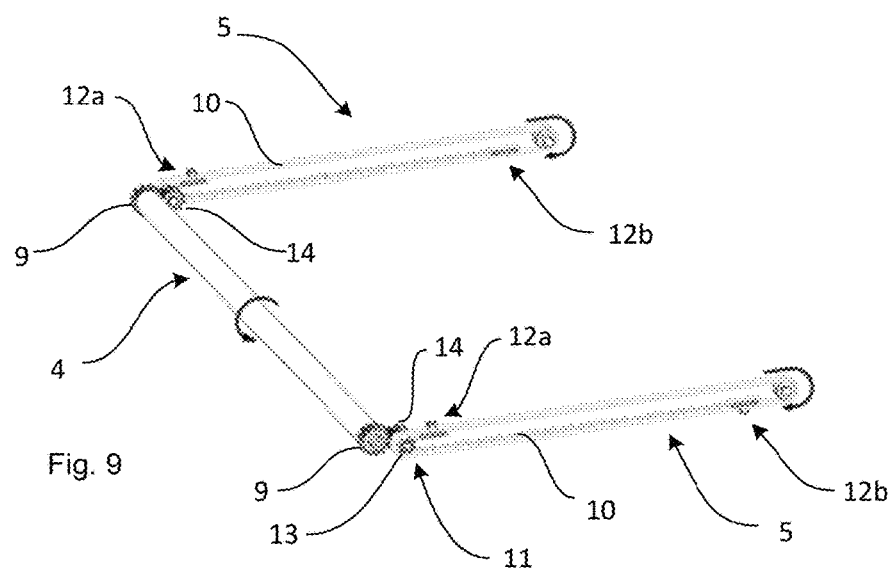
FIG. 9 shows a perspective view of a shaft module and two transmission modules of a rolling display arrangement in accordance with one embodiment of the present disclosure.

A counterclockwise rotational movement of the drive shaft 8 is transferred to linear movement of the first rigid part 7a in a first direction D1, as shown in FIGS. 2 and 9, and simultaneously to linear movement of the second rigid part 7b in the second direction D2, the second direction D2 being opposite to the first direction D1. Correspondingly, a clockwise rotational movement of the drive shaft 8 is transferred to linear movement of the first rigid part 7a in the second direction D2, and to linear movement of the second rigid part 7b in the first direction D1.

In the retracted position P1, shown in FIGS. 2, 5, and 18, the first main side 22c of the chassis module 22 is fully covered by the first rigid part 7a, and the second main side 22d of the chassis module 22 is fully covered by the second rigid part 7b and a part of the flexible part 7c. In the extended position P2, shown in FIGS. 1, 2, 5, 13, and 15, the first main side 22c of the chassis module 22 is fully covered by the first rigid part 7a and a part of the flexible part 7c, and the second main side 22d of the chassis module 22 is partially covered by the second rigid part 7b.

The rolling display arrangement 1 is moved to the extended position P2 when counterclockwise rotational movement of the drive shaft 8 is transferred to linear movement of the first rigid part 7a in the first direction D1 and to linear movement of the second rigid part 7b in a second, opposite direction. Correspondingly, the rolling display arrangement 1 is moved to a retracted position P1 when clockwise rotational movement of the drive shaft 8 is transferred to linear movement of the first rigid part 7a in the second direction D2, and to linear movement of the second rigid part 7b in the first direction D1.

In one embodiment, the electronic device 2 comprises a spring module 24 arranged between the first main side 22c of the chassis module 22 and the display module 3. As shown in FIGS. 4 and 5, the spring module 24 comprises a spring support 24a as shown in FIG. 3 and a tension spring 24b. A first end of the tension spring 24b is connected to the spring support 24a, adjacent the end cap module 23, and the second, opposite end of the tension spring 24b is connected to the first rigid part 7a of the display module 3. The second end of the tension spring 24b is moved in the first direction D1 and in the second direction D2 of linear movement along with the first rigid part 7a.

The main function of the tension spring 24b is to help tighten the flexible display 6 and rolling in/out the rolling display arrangement 1. The tension spring 24b changes form as the rolling display arrangement 1 moves. When the rolling display arrangement 1 is moved to the retracted position P1, the spring force ensures that the flexible display 6 is tightened and does not slide out. When the rolling display arrangement 1 is moved to the expanded position P2, the spring force holds the flexible display 6, such that it does not shrink arbitrarily without any external force.

Figure 13:
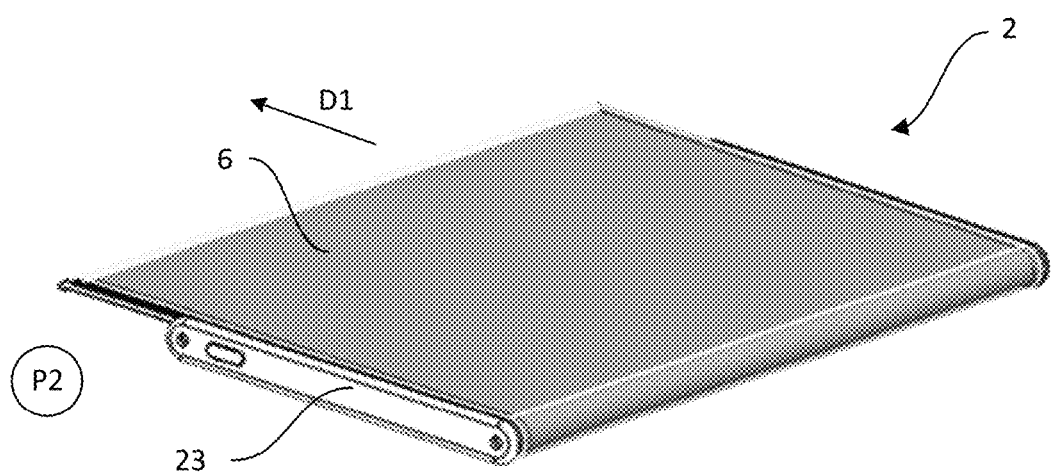
FIG. 13 shows a perspective view of a part of an electronic device comprising a rolling display arrangement in accordance with one embodiment of the present disclosure.

The rolling display arrangement 1 may be operated manually. However, the rolling display arrangement 1 may also be operated electronically. In one embodiment, the rolling display arrangement 1 comprises an electric motor 20, shown in FIG. 12. A motor gear 21 of the electric motor 20 meshes with the synchronizing gear 14 of the transmission module 5, such that the electric motor 20 effectuates the rotational movement of both the shaft module 4 and the transmission module 5. The electric motor 20 is connected with a sub printed circuit board assembly (PCBA) by means of 2 pads. A key for operating the electric motor 20 has to be added to the electronic device 2, as shown in FIG. 13.

As mentioned above, the display module 3 comprises a display support 7 and a flexible display 6, shown in FIG. 14. The flexible display 6 comprises a covering structure 30 comprising a cover layer 31 and a polarizing layer 32, and a displaying structure 33 adhered to the covering structure 30 by means of a first adhesive layer 34a. The displaying structure 33 comprises a plurality of layers, at least one layer for example an organic light-emitting diode (OLED) panel layer 35 or active-matrix OLED (AMOLED) panel layer 35.

The cover layer 31 and the polarizing layer 32 may comprise at least partially of polymer material, for example polyimide. In one embodiment, the cover layer 31 comprises completely of polymer material. The polarizing layer may comprise only one material, for example a liquid crystal polymer material. In a further embodiment, the polarizing layer 32 comprises of two sub-layers coated onto each other, one sub-layer of polymer material and one sub-layer comprising a polarizer coated directly onto the polymer material sub-layer. This eliminates the need for additional adhesive or support layers within the flexible display 6. The polarizer may be a circular polarizer, e.g., comprising of a linear polarizer and a quarter wave plate. The two sub-layers may be coated as separate layers and comprise of the same base material but having different polymer molecule orientation. Other solutions are however conceivable.

The displaying structure 33 may comprises a touch sensor, located within a panel layer 35 (not shown). The displaying structure 33 may comprise a touch sensor layer 36 and a second adhesive layer 34b, the second adhesive layer 34b attaching the touch sensor layer 36 to the panel layer 35. The second adhesive layer 34b for example a pressure sensitive adhesive. The polarizing layer 32 may be arranged between the cover layer 31 and the touch sensor layer 36.

In a further embodiment, the cover layer 31 comprises a plurality of sub-layers being attached to each other by a third adhesive layer 34c, in which case the polarizing layer 32 is coated directly onto one of the sub-layers (not shown).

Regardless of the location of the polarizing layer, the polarizing layer 32 may be coated directly onto an adjacent layer, i.e. the polarizing layer 32 may be coated directly onto a peripheral layer of the displaying structure 33 or coated directly onto one of the layers of the covering structure 30.

In one embodiment, the covering structure 30 comprises a hard coating 37 adhered to the cover layer 31.

At least one of the first, second, and third adhesive layers 34a, 34b, 34c comprise optically clear adhesive. At least one of the first, second, and third adhesive layers 34a, 34b, 34c may have anti-shock properties.

The various aspects and implementations have been described in conjunction with various embodiments herein. However, other variations to the disclosed embodiments can be understood and effected by those skilled in the art in practicing the disclosed subject-matter, from a study of the drawings, the disclosure, and/or the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The reference signs used in the claims shall not be construed as limiting the scope.

What is claimed is:

1. A rolling display arrangement for an electronic device, the rolling display arrangement comprising:
   a display;
   a shaft; and
   at least one transmission module;
   wherein the display comprises a flexible display and a display support, the display support comprising a first rigid part, a second rigid part, and a flexible part arranged between the first rigid part and the second rigid part;
   wherein the first rigid part and the second rigid part extend in parallel;
   wherein the flexible part partially encloses the shaft;
   wherein the shaft further comprises:
      a drive shaft and a drive shaft gear;
      a freely rotatable outer shaft; and
      a stationary center shaft;
   wherein the outer shaft, the drive shaft, and the center shaft share a second center axis;
   wherein the drive shaft is arranged between the outer shaft and the center shaft;

wherein the outer shaft is in abutment with the flexible part of the display support;
wherein the outer shaft comprises a helix-shaped cut extending through the wall of the outer shaft, in the direction of the second center axis;
wherein the at least one transmission module is interconnected with the first rigid part and the second rigid part of the display, and with the drive shaft gear of the shaft; and
wherein the at least one transmission module is configured to transfer rotational movement of the shaft and the transmission module to linear movement of the display.

2. The rolling display arrangement according to claim 1, wherein the at least one transmission module comprises:
a drive belt;
a transmission gear arrangement driving the drive belt;
a first display clamp; and
a second display clamp arranged on the drive belt;
wherein the first display clamp is interconnected with the first rigid part of the display support, and wherein the second display clamp is interconnected with the second rigid part of the display support.

3. The rolling display arrangement according to claim 2, wherein the drive belt is arranged between the first rigid part and the second rigid part of the display support.

4. The rolling display arrangement according to claim 2, wherein the transmission gear arrangement comprises:
a drive belt gear driving the drive belt; and
a synchronizing gear meshing with the drive shaft gear of the shaft;
wherein the drive belt gear and the synchronizing gear share a first center axis.

5. The rolling display arrangement according to claim 2, wherein the first display clamp and the second display clamp of the at least one transmission module each comprises a protrusion extending from the drive belt;
wherein the first rigid part and the second rigid part of the display support each comprises a recess for accommodating the protrusion.

6. The rolling display arrangement according to claim 1, wherein the outer shaft is configured to rotate in response to the linear movement of the display.

7. The rolling display arrangement according to claim 1, wherein counterclockwise rotational movement of the drive shaft is transferred to linear movement of the first rigid part in a first direction and linear movement of the second rigid part in a second direction, the second direction being opposite to the first direction;
wherein clockwise rotational movement of the drive shaft is transferred to linear movement of the first rigid part in the second direction and linear movement of the second rigid part in the first direction.

8. The rolling display arrangement according to claim 1, wherein the linear movement of the display is perpendicular to the second center axis.

9. The rolling display arrangement according to claim 1, wherein the rolling display arrangement further comprises an electric motor;
wherein a motor gear of the electric motor meshes with a synchronizing gear of the at least one transmission module; and
wherein the electric motor effectuates the rotational movement of the shaft and the at least one transmission module.

10. An electronic device, comprising:
a chassis;
two end caps arranged at opposite short sides of the chassis; and
a rolling display arrangement, wherein the rolling display arrangement comprises a display, a shaft, and at least one transmission module;
wherein the display comprises a flexible display and a display support, wherein the display support comprises a first rigid part, a second rigid part, and a flexible part arranged between the first rigid part and the second rigid part;
wherein the first rigid part and the second rigid part extend in parallel;
wherein the flexible part partially encloses the shaft;
wherein the shaft further comprises:
a drive shaft and a drive shaft gear;
a freely rotatable outer shaft; and
a stationary center shaft;
wherein the outer shaft, the drive shaft, and the center shaft share a center axis;
wherein the drive shaft is arranged between the outer shaft and the center shaft;
wherein the outer shaft is in abutment with the flexible part of the display support;
wherein the outer shaft comprises a helix-shaped cut extending through the wall of the outer shaft, in the direction of the center axis;
wherein the at least one transmission module is interconnected with the first rigid part and the second rigid part of the display, and with the drive shaft gear of the shaft;
wherein the at least one transmission module is configured to transfer rotational movement of the shaft and the at least one transmission module to linear movement of the display;
wherein the rolling display arrangement partially encloses the chassis;
wherein the rolling display arrangement is interlocked with the chassis via the end caps;
wherein the shaft of the rolling display arrangement extends adjacent a long side of the chassis between the end caps; and
wherein each transmission module of the rolling display arrangement extends between a short side of the chassis and a respective end cap.

11. The electronic device according to claim 10, wherein the first rigid part of the display extends adjacent a first main side of the chassis, and the second rigid part of the display extends adjacent a second, opposite main side of the chassis; and
wherein the flexible part of the display extends from the first main side to the second main side.

12. The electronic device according to claim 10, further comprising:
a spring arranged between a first main side of the chassis and the display;
wherein the spring comprises a spring support and a tension spring;
wherein a first end of the tension spring is connected to the spring support, adjacent the end caps;
wherein a second end of the tension spring is connected to the first rigid part of the display; and
wherein the second end of the tension spring is movable in a first direction and in a second direction of linear movement along with the first rigid part.

13. The electronic device according to claim 10, wherein the end caps are releasably interconnected with the stationary center shaft of the shaft.

14. The electronic device according to claim 10, wherein the rolling display arrangement is configurable to be in a retracted position or an extended position;
- wherein based on the rolling display arrangement being in the retracted position, the display covers a first main side of the chassis, and the display covers a part of a second main side of the chassis, wherein the second main side is opposite to the first main side of the chassis;
- wherein based on the rolling display arrangement being in the extended position, the display protrudes past the first main side of the chassis, and the display covers a part of the second main side of the chassis which is smaller than the part of the second main side of the chassis covered by the display in the retracted position.

15. The electronic device according to claim 14, wherein, in the retracted position, the first main side of the chassis is fully covered by the first rigid part of the display, and the second main side of the chassis is fully covered by the second rigid part of the display and a part of the flexible part of the display; and wherein, in the extended position, the first main side of the chassis is fully covered by the first rigid part of the display and a part of the flexible part of the display, and the second main side of the chassis is partially covered by the second rigid part of the display.

16. The electronic device according to claim 14, wherein the rolling display arrangement is movable to the extended position based on counterclockwise rotational movement of the drive shaft of the shaft being transferred to linear movement of the first rigid part of the display in a first direction and to linear movement of the second rigid part of the display in a second, opposite direction; and wherein the rolling display arrangement is movable to the retracted position based on clockwise rotational movement of the drive shaft of the shaft being transferred to linear movement of the first rigid part of the display in the second direction and to linear movement of the second rigid part of the display in the first direction.

* * * * *